United States Patent
Barnes

(10) Patent No.: US 9,633,474 B2
(45) Date of Patent: Apr. 25, 2017

(54) METHOD AND APPARATUS FOR GENERATING A COMPOSITE INDEXABLE LINEAR DATA STRUCTURE TO PERMIT SELECTION OF MAP ELEMENTS BASED ON LINEAR ELEMENTS

(71) Applicant: HERE Global B.V., Veldhoven (NL)

(72) Inventor: Craig R. Barnes, Forest Park, IL (US)

(73) Assignee: HERE Global B.V., Veldhoven (NL)

( * ) Notice: Subject to any disclaimer, the term of this patent is extended or adjusted under 35 U.S.C. 154(b) by 126 days.

(21) Appl. No.: 14/282,144

(22) Filed: May 20, 2014

(65) Prior Publication Data

US 2015/0339848 A1 Nov. 26, 2015

(51) Int. Cl.
*G06T 17/05* (2011.01)
*G06F 17/30* (2006.01)

(52) U.S. Cl.
CPC ........ *G06T 17/05* (2013.01); *G06F 17/30241* (2013.01); *G06T 2210/12* (2013.01)

(58) Field of Classification Search
None
See application file for complete search history.

(56) References Cited

U.S. PATENT DOCUMENTS

| 6,073,076 | A | * | 6/2000 | Crowley | ............... | G01C 21/26 |
| | | | | | | 701/400 |
| 7,925,272 | B2 | * | 4/2011 | Hjelm | ................ | G06F 17/3087 |
| | | | | | | 455/404.2 |
| 2002/0169778 | A1 | * | 11/2002 | Natesan | ................. | G01C 21/32 |
| 2004/0008225 | A1 | * | 1/2004 | Campbell | ............ | G01C 21/367 |
| | | | | | | 715/764 |
| 2015/0241225 | A1 | * | 8/2015 | Liu | .................... | G01C 21/3682 |
| | | | | | | 701/540 |

* cited by examiner

*Primary Examiner* — Kee M Tung
*Assistant Examiner* — Nicholas R Wilson
(74) *Attorney, Agent, or Firm* — Alston & Bird LLP

(57) ABSTRACT

A method, apparatus and computer program product are provided for generating a composite indexable linear data structure to permit selection of map elements based on linear elements. In the context of a method, map data and a selected linear element indication are received. The map data comprises a list of map elements. The method also includes extracting map elements within a bounding box, and indexing the extracted map elements. The indexing is spatial indexing. The method also includes correlating the indexed map elements with a plurality of sub segments of the linear element, and generating a composite indexable linear data structure based on the correlation of map elements with the plurality of sub-segments of the linear element.

20 Claims, 9 Drawing Sheets

METHOD AND APPARATUS FOR GENERATING A COMPOSITE INDEXABLE LINEAR DATA STRUCTURE TO PERMIT SELECTION OF MAP ELEMENTS BASED ON LINEAR ELEMENTS

TECHNOLOGICAL FIELD

An example embodiment of the present invention relates to map rendering and, more particularly, to a method, apparatus and computer program product for generating a composite indexable linear data structure to permit selection of map elements based on linear elements.

BACKGROUND

In some map rendering systems selection of map elements or particular elements along a street, path, or trail is not possible or is restricted to the geographical information system (GIS) database spatial queries. The GIS database spatial queries may be too slow for effective interactive map rendering applications.

The rendering of maps using raster based tiles, in some map rendering systems, limits selections and visualization of elements to overlays, which are limited in how they may change underlying map element. In the case of three dimensional maps the use of overlays in this manner is not possible.

BRIEF SUMMARY

A method, apparatus and computer program product are provided in accordance with an example embodiment for generating an indexable linear data structure to permit selection of map elements based on linear elements. In an example embodiment, a method is provided that includes receiving map data and a selected linear element indication. The map data includes a list of map elements. The method also includes extracting map elements within a bounding box and indexing the extracted map elements, such as by spatial indexing. The method also includes correlating the indexed map elements with a plurality of sub segments of the linear element and generating a composite indexable linear data structure based on the correlation of map elements with the plurality of sub-segments of the linear element.

In an example embodiment of the method, correlating the indexed map elements with a plurality of sub-segments of the linear element includes segmenting the linear element into the plurality of sub-segments and searching the spatial index for map elements within a predetermined distance from the sub-segment. In some example embodiments of the method, extracting map elements includes extracting map elements from a spatial database. In further example embodiments of the method, the extracted map data comprises relational data, shape data, or keyhole markup language file data.

In an example embodiment of the method, the composite indexable linear data structure comprises a list of indexed map elements, wherein the list of indexed map elements comprises vector, hash table, or linked list elements. In an example embodiment, the method may also include sorting an indexable linear data structure by distance from the sub-segment of the linear element. In some example embodiments of the method, the linear element is a street, path, or trail.

In another example embodiment, an apparatus is provided including at least one processor and at least one memory including computer program code with the at least one memory and computer program code configured to, with the processor, cause the apparatus to at least receive map data and a selected linear element indication. The map data includes a list of map elements. The at least one memory and computer program code of the example embodiment are also configured to, with the processor, cause the apparatus to extract map elements within a bounding box and index the extracted map elements, such as by spatial indexing. The map data comprises a list of map elements. The at least one memory and computer program code of the example embodiment are also configured to, with the processor, cause the apparatus to correlate the indexed map elements with a plurality of sub segments of the linear element and generate a composite indexable linear data structure based on the correlation of map elements with the plurality of sub-segments of the linear element.

In an example embodiment of the apparatus, correlating the indexed map elements with a plurality of sub-segments of the linear element includes segmenting the linear element into the plurality of sub-segments and searching the spatial index for map elements within a predetermined distance from the sub-segment. In some example embodiments of the apparatus, extracting map elements includes extracting map elements from a spatial database. In further example embodiments of the apparatus, the extracted map data comprises relational data, shape data, or keyhole markup language file data.

In an example embodiment of the apparatus, the composite indexable linear data structure comprises a list of indexed map elements, wherein the list of indexed map elements comprises vector, hash table, or linked list elements. In an example embodiment of the apparatus, the at least one memory and the computer program code are further configured to sort an indexable linear data structure by distance from the sub-segment of the linear element. In some example embodiments of the method, the linear element is a street, path, or trail.

In a further example embodiment, a computer program product is provided including at least one non-transitory computer-readable storage medium having computer-executable program code portions stored therein with the computer-executable program code portions comprising program code instructions configured to receive map data and a selected linear element indication. The map data includes a list of map elements. The computer-executable program code portions of the example embodiment also comprise program code instructions configured to extract map elements within a bounding box and index the extracted map elements, such as by spatial indexing. The computer-executable program code portions of the example embodiment also comprise program code instructions configured to correlate the indexed map elements with a plurality of sub segments of the linear element, and generate a composite indexable linear data structure based on the correlation of map elements with the plurality of sub-segments of the linear element.

In an example embodiment of the computer program product, correlating the indexed map elements with a plurality of sub-segments of the linear element includes segmenting the linear element into the plurality of sub-segments and searching the spatial index for map elements within a predetermined distance from the sub-segment. In some example embodiments of the computer program product, extracting map elements includes extracting map elements from a spatial database. In further example embodiments of the computer program product, the extracted map data comprises relational data, shape data, or keyhole markup language file data.

In an example embodiment of the computer program product, the composite indexable linear data structure comprises a list of indexed map elements, wherein the list of indexed map elements comprises vector, hash table, or linked list elements. In an example embodiment of the computer program product, computer-executable program code portions further comprise program code instructions configured to sort an indexable linear data structure by distance from the sub-segment of the linear element.

In yet another example embodiment, an apparatus is provided that includes means for receiving map data and a selected linear element indication. The map data includes a list of map elements. The apparatus also includes means for extracting map elements within a bounding box and means for indexing the extracted map elements, such as by spatial indexing. The apparatus also includes means for correlating the indexed map elements with a plurality of sub segments of the linear element and means for generating a composite indexable linear data structure based on the correlation of map elements with the plurality of sub-segments of the linear element.

BRIEF DESCRIPTION OF THE DRAWINGS

Figure 1:
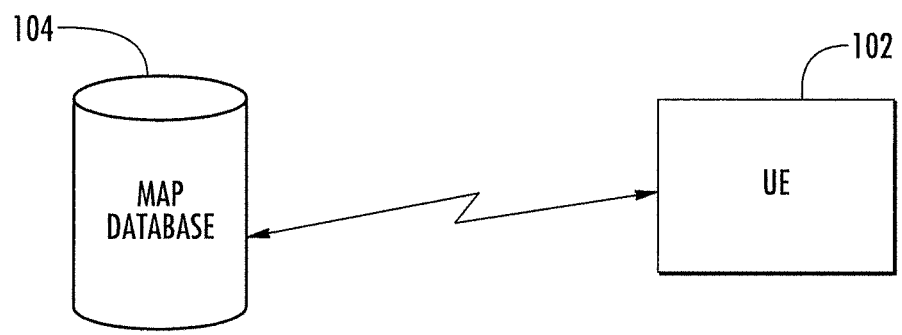
Figure 2:
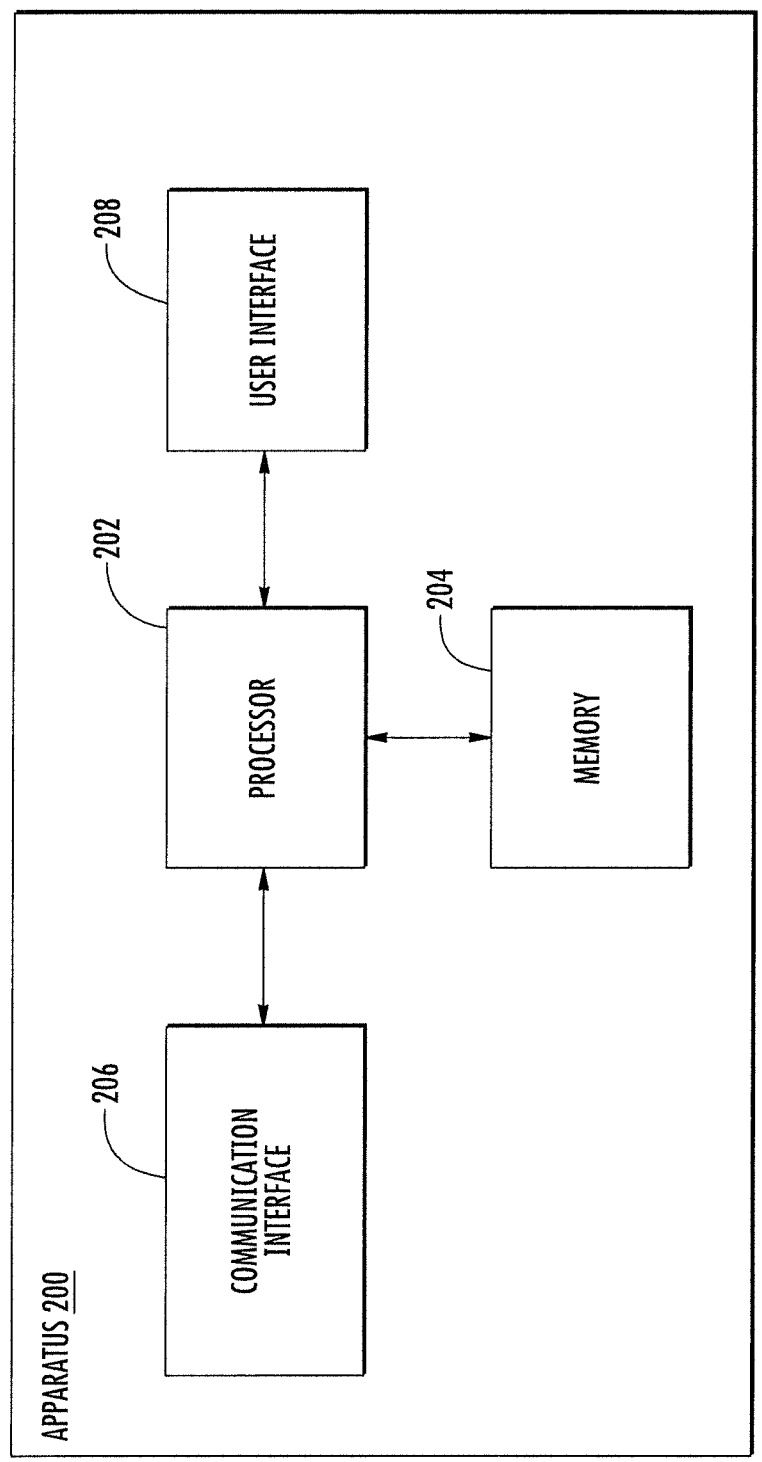
Figure 3:
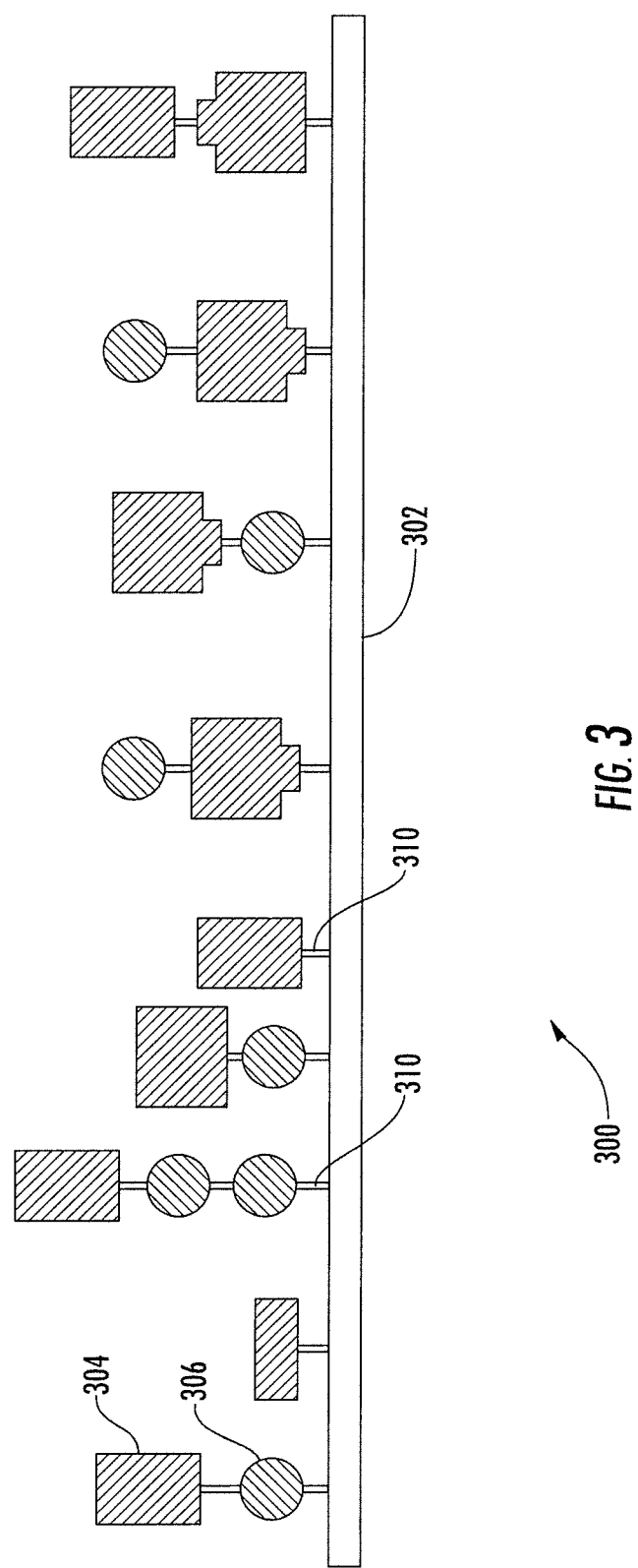
Figure 4:
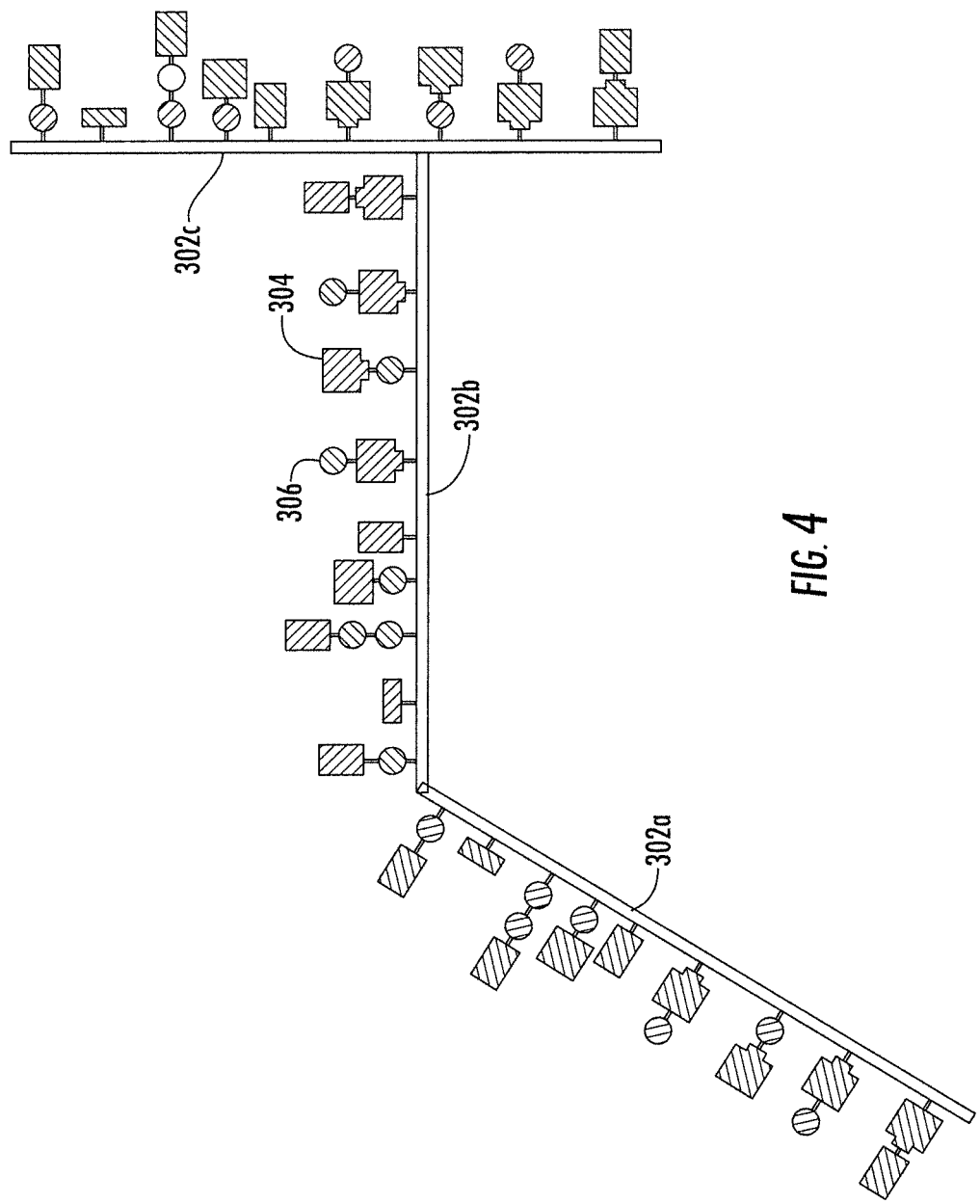
Figure 7:
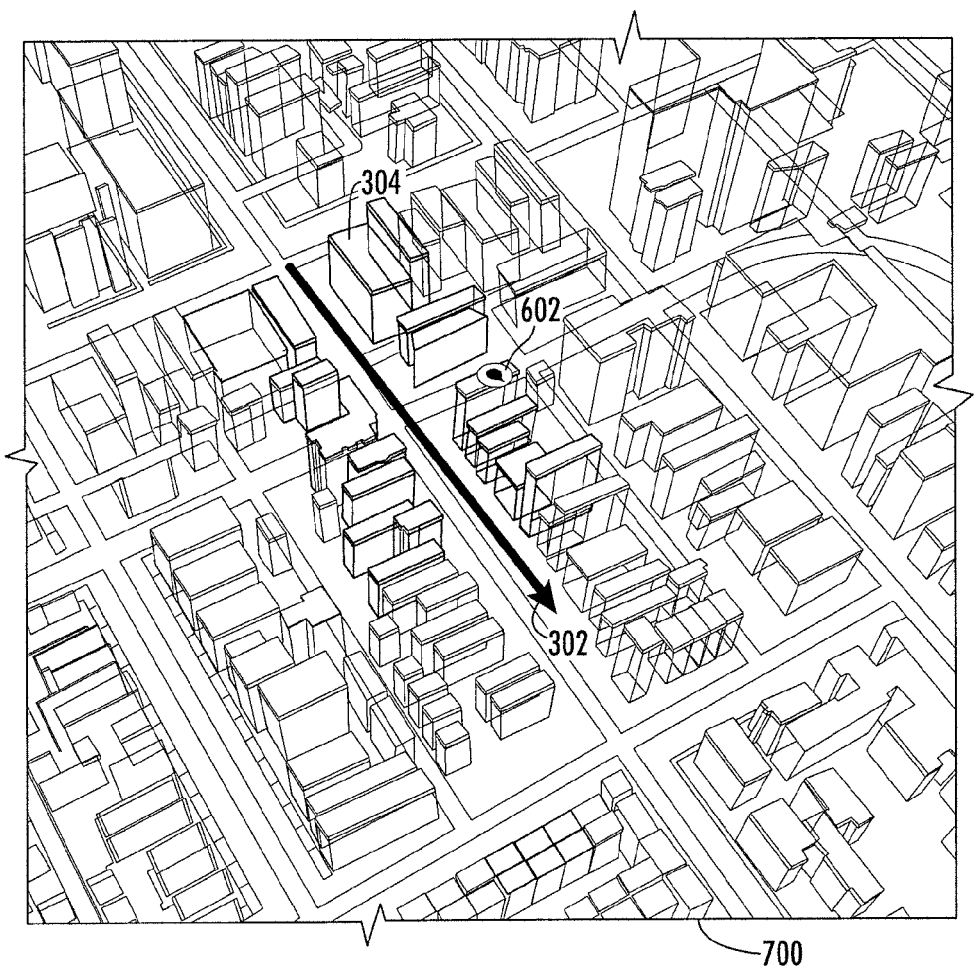
Figure 8:
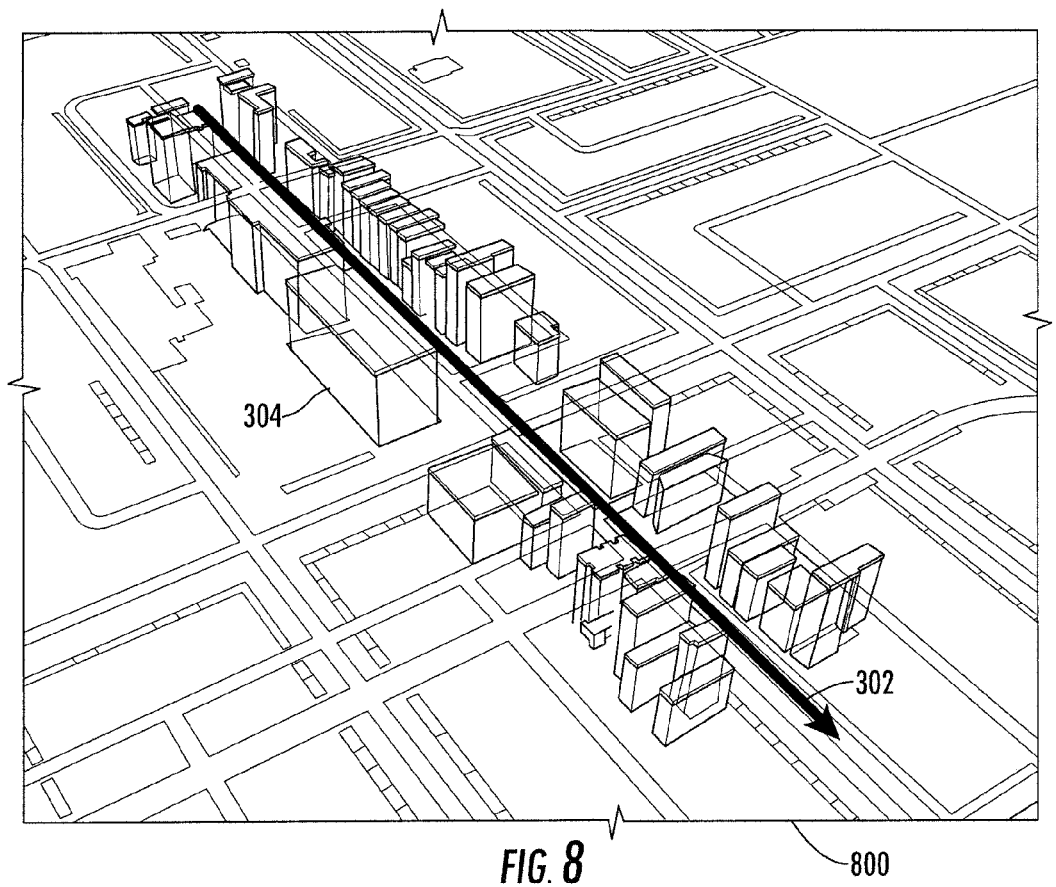
Figure 9:
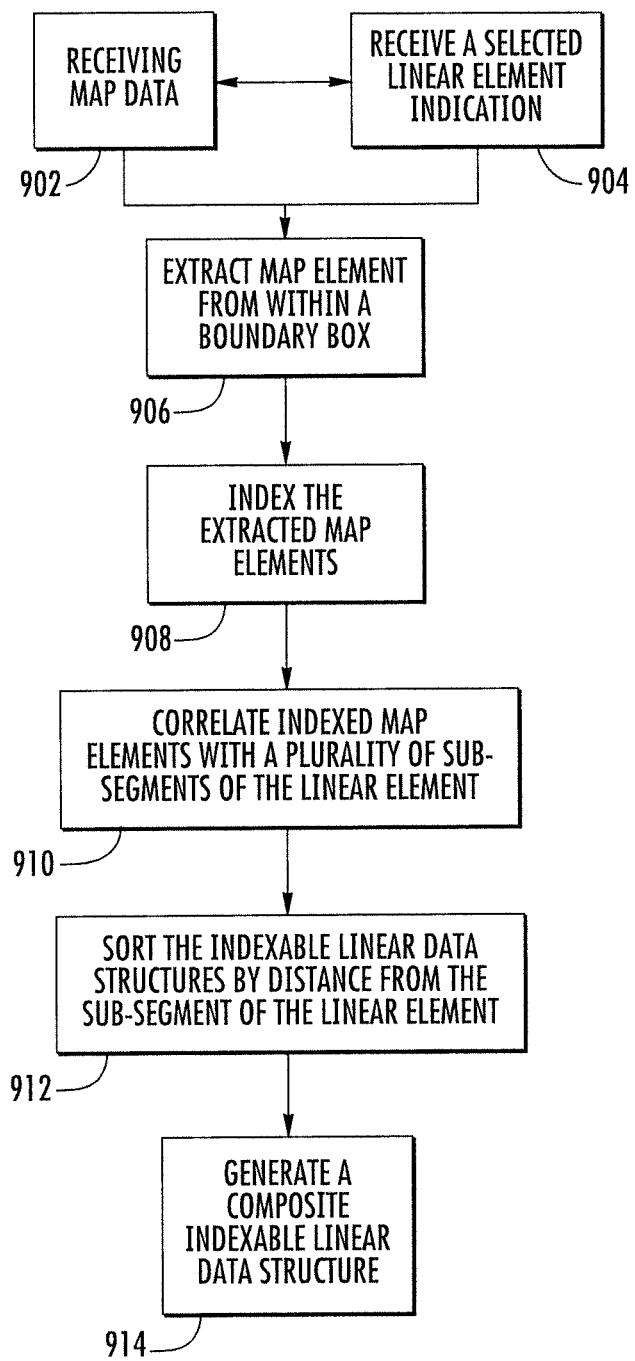

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for generating an composite indexable linear data structure to permit selection of map elements based on linear elements in accordance with an example embodiment of the present invention;

FIGS. 3 and 4 illustrate example composite indexable linear data structures in accordance with an embodiment of the present invention;

FIGS. 5-8 illustrate example map renderings utilizing a composite indexable linear data structure in accordance with an embodiment of the present invention; and FIG. 9 is a flow chart illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

As digital map rendering become more dynamic, both in terms of display and interaction, it may be necessary to develop new methods of controlling how the map rendering displays information. Similarly, the use of contextual maps, which change information based on use, may also require a new method of controlling map rendering displays.

In example embodiments of the present invention, a data structure is generated, e.g. a composite indexable linear data structure, which may be utilized to relate map elements, such as building footprints, points of interest (POIs), building meshes, and other map elements, such as labels, to linear map elements such as streets, paths, trails, or the like. The data structure, once generated, may be utilized to select map elements associated with a linear element, allowing enhanced display of the selected elements and new forms of user interaction.

Communications Diagram

A method, apparatus and computer program product are provided in accordance with an example embodiment for generating an indexable linear data structure to permit selection of map elements based on linear elements. FIG. 1 illustrates a communication diagram including user equipment (UE) 102, in data communications with a map database 104. The UE 102 may include the map database 104, such as a local map data memory, or be associated with the map database, such as a remote map data server. The UE 102 may be a mobile computing device such as a laptop computer, tablet computer, mobile phone, smart phone, navigation unit, personal data assistant, or the like. Additionally or alternatively the UE 102 may be a fixed computing device, such as a personal computer, computer workstation, kiosk, office terminal computer or system, or the like.

The UE 102 may receive a selected linear element indication. The selected linear element indication may be based on the current location of the user, e.g. current location street, and/or the UE 102 or a series of locations, such past locations for a predetermined period of time, such as 30 seconds, 1 minute, 5 minutes, 30 minutes, or any other time period. The location data may be received from a locations sensor, such as global positioning sensor, associated with the UE 102. The selected linear element indication may also be based on a destination location, which may be entered by the user, such as a specific address or business, or a destination area such as "uptown" Charlotte.

Additionally or alternatively, the selected linear element indication may be a navigational route using streets, paths, trails, highways, or the like. The UE 102 may determine or receive a route data associated with the current or starting location and the destination location and select the linear elements associated with the route.

In an example embodiment, map data may be displayed on the UE 102 user interface based on a request for the map data or current location. The user may select a linear element using the user interface, such as selecting a street or tracing a route.

The UE 102 may receive map data from the map database 104. The map database 104 may include one or more sub-databases, including geographic regions; subject matter, e.g. street map, transit maps, survey maps, or the like; spatial database, e.g. spatial locations, such as latitude or longitude, relational databases, e.g. relationships between map elements, or the like. The map data may include the geographic elements, such as lakes, cities, topography, or the like and information elements such as streets, building foot prints, businesses, transit lines, parks, paths, walkways, trails, labels, building meshes, points of interest (POIs), or the like. In some instances map data may be received by the UE 102 in response to receiving location data, e.g. current location, series of locations, and/or destination location. The UE 102 may request and receive map data associated with a current location and/or a destination location. In an example embodiment, the UE 102 may receive the map data based on the selection of a linear element, such as "Main Street Murphysboro, Ill." The UE may request map data which contains the Illinois, Murphysboro, main street, or a combination of the requested elements.

The UE 102 may determine a boundary box, e.g. the longitudinal and latitudinal definition of map elements that may be used for further processing and rendering. The UE 102 may generate a list of map elements which are within the boundary box. The UE 120 may determine the boundary box automatically based on the location data, e.g. the current location. The UE 102 may determine the boundary box based on the rate of change of the current location data, e.g. a boundary box of sufficient size to render useful information at the current rate of travel, e.g. ½ mile at a rate of 15 miles per hour or 2 miles at 70 mile per hour. Additionally or alternatively the UE 102 may use the density of the map data elements in the boundary box determination, e.g. the UE may determine a larger boundary box in a rural area with few map data elements and a smaller boundary box in an urban area with a high map element density.

Additionally or alternatively, the UE 102 may receive a boundary box selection indication from the user interface, in an instance in which the user selects or alters the focus or zoom level.

The UE 102 may extract, e.g. copy, the map elements data for elements within the boundary box from a spatial data database which may be associated with or a portion of the map database 104. The map element data may include relational information, shape data, key markup language file data, or the other geospatial data. The relational data may additionally or alternatively be extracted from a relational database which may be associated with, or a portion of, the map database 104.

The UE 102 may spatially index each of the respective extracted map elements. The UE 102 may spatially index the map element data using a quad-tree, R*Tree, kd-tree, or the like. The spatial index may be used for the duration of the algorithm for generating the indexable linear data structure and may be discarded or saved to a memory when the algorithm has completed.

The UE 102 may sample, e.g. segment, each of the selected linear elements evenly along its entire length. Sampling may include segmentation of the linear element and determination of the coordinate positions of the segment endpoints. The size of the subsample, may be a parameter of the algorithm, e.g. SUBSIZE, and may be selected so that sub-segments of 1 meter or less are generated. The sampling size could be selected for any distance measurement which would allow for useful distribution of elements, e.g. in a rural environment a 1 mile sampling size may be appropriate due to sparse map element density, wherein in an urban area a sampling size of 100 feet may render too may map elements to be displayed on the UE 102 or used by the user.

The UE 102 may query the spatial index for each sub segment endpoint for map elements within a predetermined distance from the sub-segment endpoint coordinates, e.g. MAXDISTANCE, to generate a list of map elements which are closest to the sub-segment. In an example embodiment, the UE may perform the query of the spatial index using a radius search, which may return all of the map elements within the MAXDISTANCE radius. Additionally or alternatively, the UE 102 may perform the query of the spatial index, by fattening the sub-segment, e.g. widening the sub-segment by a function of the MAXDISTANCE, for example ½ the MAXDISTNCE on each side of the sub-segment. The query may return a list of map elements within range of the sub-segment.

The UE 102 may generate an indexable linear data structure by grouping, e.g. correlating, the indexed map elements in to a list associated with the sub-segment, and inserting each into an indexable linear data structure, such as a vector, hash table, linked list or the like. In an example embodiment, each indexable linear data structure may be sorted by the distance from the segment point. The UE 102 may compile the indexable linear data structures in to a composite indexable linear data structure.

Example Apparatus

A UE 102 may include or otherwise be associated with an apparatus 200 as shown in FIG. 2. The apparatus, such as that shown in FIG. 2, is specifically configured in accordance with an example embodiment of the present invention to generate an indexable linear data structure to permit selection of map elements based on linear elements. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by UE 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 110, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Composite Indexable Linear Data Structures

FIGS. 3 and 4 illustrate example composite indexable linear data structures in accordance with an embodiment of the present invention. FIG. 1 depicts a composite linear data structure 300, which has nine indexable linear data structures 310 associated with the linear element 302. The composite indexable linear data structure 300 may be a street level composite indexable linear data structure. The indexable linear data structures include POIs 306, which are represented by circles and building elements 304 represented by their respective shapes. Each map element, e.g. POI 306 and building footprint 304, is stored at an index entry and can be optionally sorted by distance from the linear element 302, e.g. street.

FIG. 4 depicts a composite indexable linear data structure which includes three linear elements 302a-c. The inclusion of multiple linear elements 302a-c permits selection of elements along a longer or more complex path, such as those found in navigational directions.

Example Map Renderings Utilizing a Composite Indexable Linear Data Structure

Figure 5:
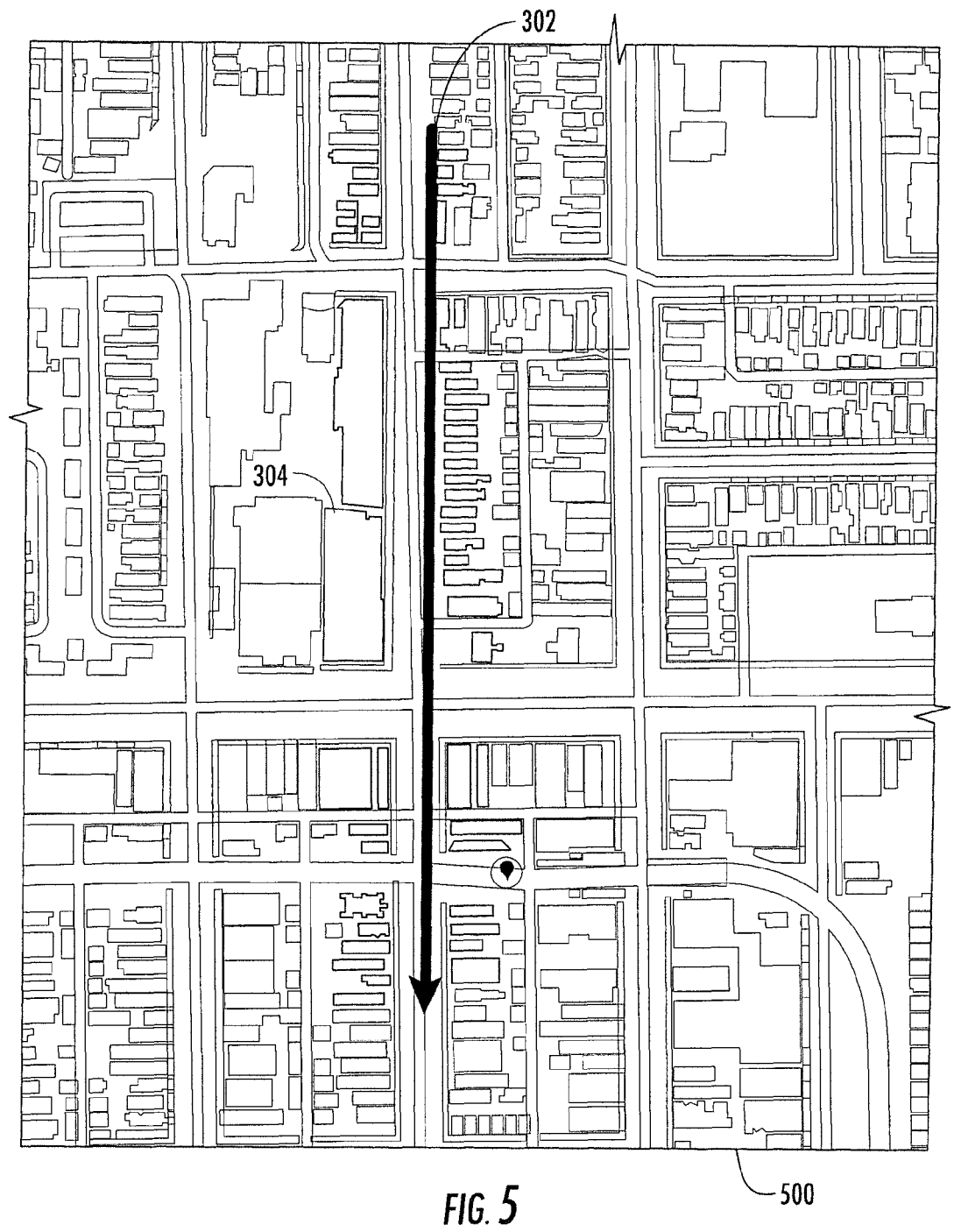
Figure 6:
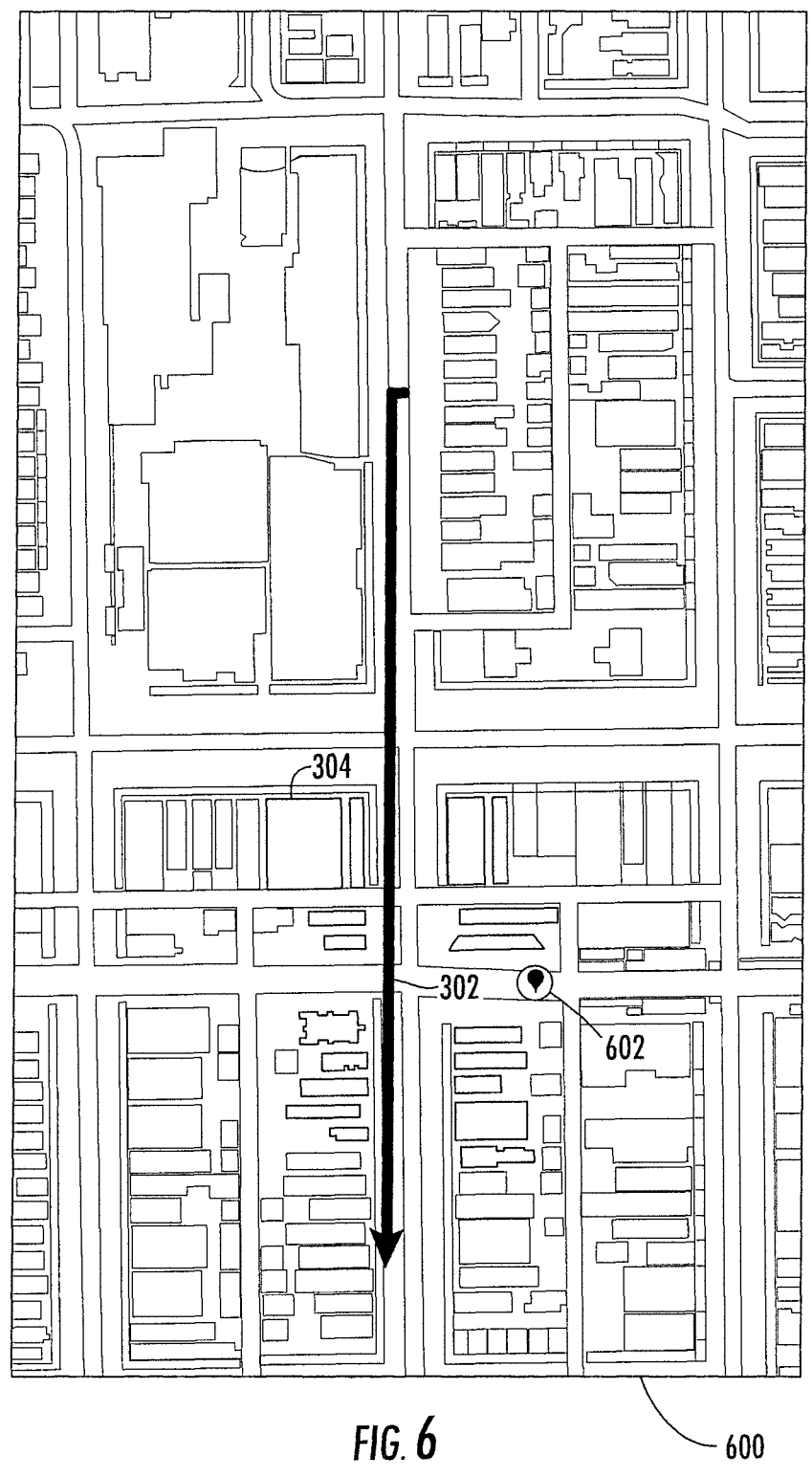

FIGS. 5-8 illustrate example map renderings utilizing a composite indexable linear data structure in accordance with an embodiment of the present invention. In FIG. 5, the building footprints 304 in the map rendering 500 have been set to a more distinct color along the linear element 302. FIG. 6 depicts a map rendering 600 in which building footprints 304 have been rendered in a distinct color, along a segment of the linear element 302, in real time based on location data 602, e.g. current location of the user and/or UE 102. FIG. 7 depicts a three dimensional map rendering 700, similar to FIG. 6, in which the building footprints 304 are depicted as three dimensional building meshes. FIG. 8 depicts a three dimensional map rendering 800, in which the building footprints/meshes 304 for the elements associated with the composite indexable linear data structure are set to a distinct color and the color for all building footprints not associated with the composite indexable linear data structure have been removed, e.g. set to no color or turned off. In other example embodiments, the map elements association with the composite indexable linear data structure may be have other demarcation, such as other color, cross hatching, or the like.

Example Process for Generating a Composite Indexable Linear Data Structure

Referring now to FIG. 9, the operations performed, such as by the apparatus 200 of FIG. 2, for generating a composite indexable linear data structure are illustrated. As shown in block 902 of FIG. 9, the apparatus 200 may include means, such as a processor 202, a communications interface 206, or the like, configured to receive map data. The processor 202 may receive the map data from the communications interface 206, which in turn may receive the map data from a memory 204, such as the map database 104. The map data may be received in response to a request based on a current location, destination location, series of locations, or the like. The map data may include the geographic elements, such as lakes, cities, topography, or the like and information elements such as streets, building foot prints, businesses, transit lines, parks, paths, walkways, trails, labels, building meshes, POIs, or the like.

Additionally or alternatively, the processor 202 may request and receive map data based on selecting a linear element, such as by the user entering the linear element information using a user interface 208, as discussed at block 904

As shown in block 904 of FIG. 9, the apparatus 200 may include means, such as a processor 202, a memory 204, a communications module 206, or the like, configured to receive a selected linear element indication. The selected linear element indication may be based on the current location of the user and/or apparatus 200, a series of locations, a destination location or the like.

Additionally or alternatively, the processor 202 may receive the selected linear element indication from the user interface 208, such as in an instance in which the user has selected a street or traced a route on a map rendering based on map data, as discussed at block 902

As shown at block 906, of FIG. 9, the apparatus 200 may include means, such as a processor 202, a memory 204, or the like, configured to extract map elements from within a boundary box. The processor 202 may generate a list of map elements which are within the boundary box. The processor 202 may determine the boundary box automatically based on the location data, rate of change of the current location data, or the like. Additionally or alternatively, the processor 202 may receive a boundary box selection indication from the user interface 208, in an instance in which the user selects or alters the focus or zoom level.

The processor 202 may extract, e.g. copy, the map elements data for elements within the boundary box from a memory 204, such as a map database 104, a spatial data database, a relational database, or the like.

As shown at block 908 of FIG. 9, the apparatus 200 may include means, such as a processor 202, or the like, configured to index extracted map elements. The processor 202 may spatially index the extracted map element data using a quad-tree, R*Tree, kd-tree, or the like.

As shown at block 910 of FIG. 9, the apparatus 200 may include means, such as a processor 202, or the like, configured to correlate indexed map elements with a plurality of sub-segments of the linear element. The processor 202 may also sample, e.g. segment, each of the selected linear elements evenly along its entire length. The processor 202 may query the spatial index for each sub-segment endpoint for map elements within a predetermined distance from the sub-segment endpoint coordinates. The query may return a list of map elements within range of the respective sub-segments. The processor 202 may generate one or more indexable linear data structures by correlating the indexed map elements in to a list associated with the sub-segment, and inserting each into a data structure, such as a vector, hash table, linked list or the like.

As shown at block 912 of FIG. 9, the apparatus 200 may include means, such as a processor 202, or the like, configured to sort the indexable linear data structures by distance from the sub-segment of the linear element.

As shown at block 914 of FIG. 9, the apparatus 200 may include means, such as a processor 202, or the like, configured to generate a composite indexable linear data structure. The processor 202 may generate a composite indexable linear data structure by compiling the indexable linear data structures into a composite indexable linear data structure.

The composite indexable linear data structure may be stored, e.g. cached in a memory 204, such as a server and transmitted in association or separately from vector map data tiles with negligible added data space.

In an instance in which a map is rendered using a composite indexable linear data structure, ambiguity in computing a segment location may be resolved using metadata associated with the map data, such as street address in the case of a POI.

After the composite indexable linear data structure has been generated it may be incorporated in map rendering applications and/or middleware. The utilization of the composite indexable linear data structures may enable new rendering features, such as setting style parameters like color and transparency in real time such as in FIGS. 4-8. Additionally, the map rendering may be animated. For example, the rendering may be animated originating from one or more points of the rendering and expanding along the linear elements, rendering the indexed map elements as the linear element is rendered expanding form each respective linear element. The animated rendering may be implemented by selecting a range of streets, a sub section of a street, point on the map, longitude/latitude, street index or other index information.

As described above, FIG. 9 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of block 912 in FIG. 9. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving map data and a selected linear element indication, wherein the map data comprises a list of map elements;
   extracting, by a processor, map elements within a bounding box;
   indexing, by the processor, the extracted map elements, wherein the indexing comprises spatial indexing;
   correlating, using the processor, the indexed map elements with a plurality of sub segments of the linear element by segmenting the linear element into the plurality of sub-segments, and searching the spatial index for map elements within a predetermined distance from each sub-segment, wherein segmenting the linear element into the plurality of sub-segments comprises segmenting the linear element into sub-segments of a predetermined length, wherein the predetermined length is established based on a density of the map elements within the bounding box;
   generating a composite indexable linear data structure based on the correlation of map elements with the plurality of sub-segments of the linear element; and
   using the composite indexable linear data structure, providing for presentation of a map rendering, wherein the map elements corresponding to the composite indexable linear data structure are visually distinguished and enhanced with one or more of building footprint data or three-dimensional building mesh data.

2. The method of claim 1, wherein extracting map elements comprises:
   extracting map elements from a spatial database.

3. The method of claim 1, wherein the extracted map elements comprises relational data, shape data, or keyhole markup language file data.

4. The method of claim 1, wherein the composite indexable linear data structure comprises a list of indexed map elements, wherein the list of indexed map elements comprises vector, hash table, or linked list elements.

5. The method of claim 1, further comprising:
   sorting an indexable linear data structure by distance from a respective one of the plurality of sub segments of the linear element.

6. The method of claim 1, wherein the linear element is a street, path, or trail.

7. The method of claim 1, wherein the establishing the predetermined length based on a density of the map elements comprises:
   determining a density of map elements within the bounding box; and
   establishing a predetermined length for the sub-segments based on the density of map elements within the bounding box.

8. An apparatus comprising at least one processor and at least one memory including computer program code, the at least one memory and computer program code configured to, with the processor, cause the apparatus to at least:
   receive map data and a selected linear element indication, wherein the map data comprises a list of map elements;
   extract map elements within a bounding box;
   index the extracted map elements, wherein the indexing comprises spatial indexing;
   correlate the indexed map elements with a plurality of sub segments of the linear element by segmenting the linear element into the plurality of sub-segments, and searching the spatial index for map elements within a predetermined distance from each sub-segment, wherein segmenting the linear element into the plurality of sub-segments comprises segmenting the linear element into sub-segments of a predetermined length, wherein the predetermined length is established based on a density of the map elements within the bounding box;

generate a composite indexable linear data structure based on the correlation of map elements with the plurality of sub-segments of the linear element; and using the composite indexable linear data structure, provide for presentation of a map rendering, wherein the map elements corresponding to the composite indexable linear data structure are visually distinguished and enhanced with one or more of building footprint data or three-dimensional building mesh data.

9. The apparatus of claim 8, wherein extracting map elements comprises:

extracting map elements from a spatial database.

10. The apparatus of claim 8, wherein the extracted map elements comprises relational data, shape data, or keyhole markup language file data.

11. The apparatus of claim 8, wherein the composite indexable linear data structure comprises a list of indexed map elements, wherein the list of indexed map elements comprises vector, hash table, or linked list elements.

12. The apparatus of claim 8, wherein the at least one memory and the computer program code are further configured to:

sort an indexable linear data structure by distance from a respective one of the plurality of sub segments of the linear element.

13. The apparatus of claim 8, wherein the linear element is a street, path, or trail.

14. The apparatus of claim 8, wherein causing the apparatus to segment the linear element into the plurality of sub-segments of a predetermined length based on a density of the map elements comprises causing the apparatus to:

determine a density of map elements within the bounding box; and establish a predetermined length for the sub-segments based on the density of map elements within the bounding box.

15. A computer program product comprising at least one non-transitory computer-readable storage medium having computer-executable program code portions stored therein, the computer-executable program code portions comprising program code instructions configured to:

receive map data and a selected linear element indication, wherein the map data comprises a list of map elements;

extract map elements within a bounding box;

index the extracted map elements, wherein the indexing comprises spatial indexing;

correlate the indexed map elements with a plurality of sub segments of the linear element by segmenting the linear element into the plurality of sub-segments, and searching the spatial index for map elements within a predetermined distance from each sub-segment, wherein segmenting the linear element into the plurality of sub-segments comprises segmenting the linear element into sub-segments of a predetermined length, wherein the predetermined length is established based on a density of the map elements within the bounding box;

generate a composite indexable linear data structure based on the correlation of map elements with the plurality of sub-segments of the linear element; and using the composite indexable linear data structure, provide for presentation of a map rendering, wherein the map elements corresponding to the composite indexable linear data structure are visually distinguished and enhanced with one or more of building footprint data or three-dimensional building mesh data.

16. The computer program product of claim 15, wherein extracting map elements comprises:

extracting map elements from a spatial database.

17. The computer program product of claim 15, wherein the extracted map elements comprises relational data, shape data, or keyhole markup language file data.

18. The computer program product of claim 15, wherein the composite indexable linear data structure comprises a list of indexed map elements, wherein the list of indexed map elements comprises vector, hash table, or linked list elements.

19. The computer program product of claim 15, wherein the computer-executable program code portions further comprise program code instructions configured to:

sort an indexable linear data structure by distance from a respective one of the plurality of sub segments of the linear element.

20. The computer program product of claim 15, wherein the program code instructions to segment the linear element into a plurality of sub-segments of a predetermined length based on the density of the map elements comprises program code instructions to:

determine a density of map elements within the bounding box; and establish a predetermined length for the sub-segments based on the density of map elements within the bounding box.

* * * * *